Patented Aug. 11, 1942

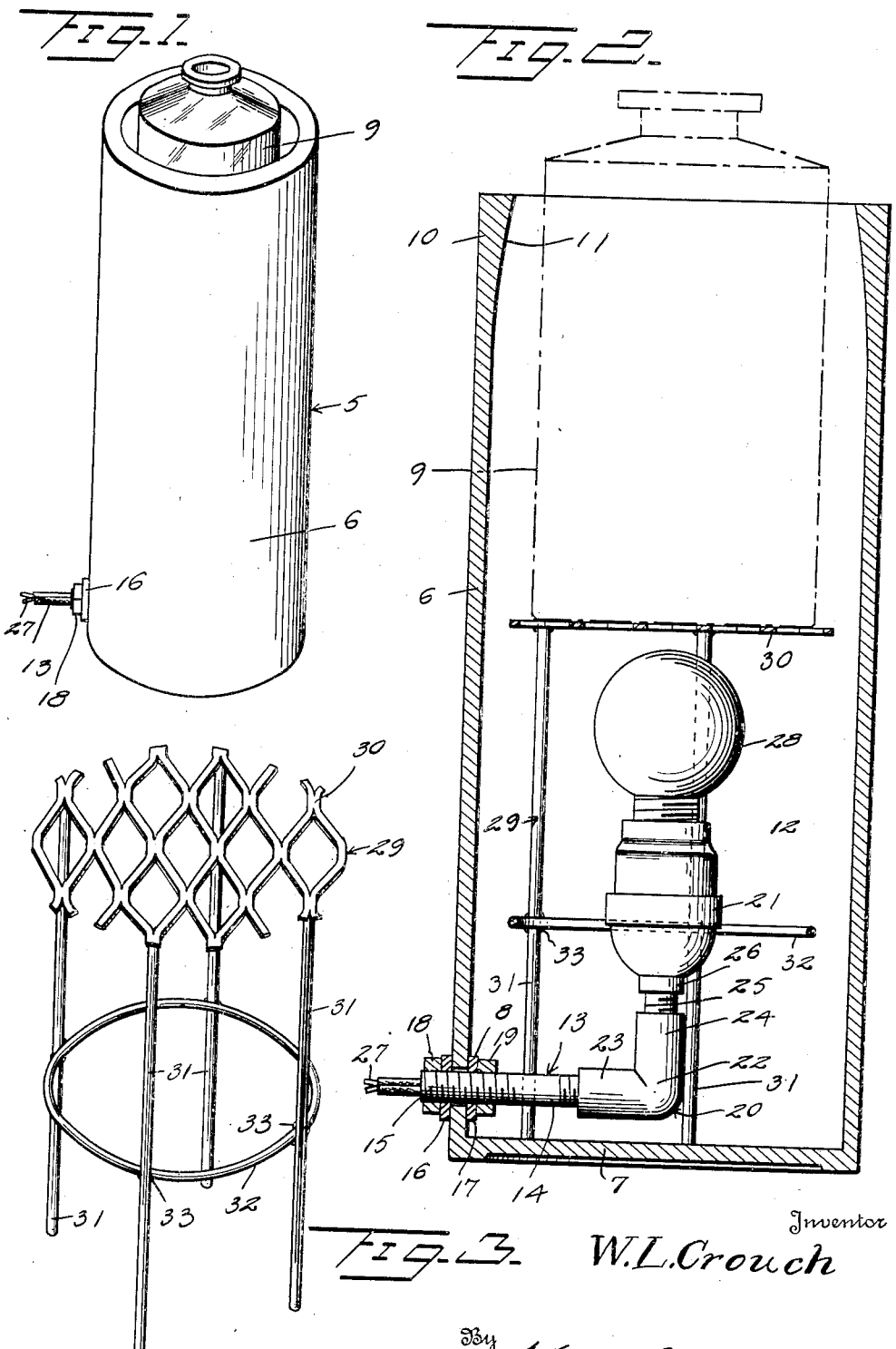

2,292,992

UNITED STATES PATENT OFFICE 2,292,992

HEATING DEVICE

William Lawrence Crouch, Dalhart, Tex.

Application May 8, 1941, Serial No. 392,551

2 Claims. (Cl. 219—45)

This invention relates to heating devices and more particularly to a means for heating liquid in a bottle.

An object of this invention is to provide a heating device for warming the liquid in a bottle without causing the liquid to become unduly heated so that the bottle will not crack during the warming of the liquid.

Another object of this invention is to provide a heating device for heating liquid in a bottle which includes an upwardly opening housing or receptacle, a heating member in the form of a light bulb in the lower portion of the housing and a bottle supporting grill removably mounted in the housing and straddling the heating member.

A further object of this invention is to provide a device of this kind wherein the housing may be formed out of vitreous material or out of metal and the inner diameter of the housing is only slightly larger than the diameter of the bottle, so that the side wall of the bottle will be heated by the rising heat in addition to the bottom of the bottle which is resting on the supporting grill.

A further object of this invention is to provide a heater designed for use in beauty parlors and barber shops for heating receptacles containing hair waving lotions or the like, which are used in treatment of the hair or skin.

Further objects of the invention are to provide, in a manner as hereinfter set forth, a heating device for the purpose referred to which is comparatively simple in its construction and arrangement, strong, durable, compact, pleasing in appearance, thoroughly efficient in its use, readily assembled and comparatively inexpensive to manufacture.

Embodying the objects aforesaid and others which may hereinafter appear, the invention consists of the novel construction, combination and arrangement of parts as will be more specifically referred to and illustrated in the drawing, wherein is shown an embodiment of the invention, but it is to be understood that changes, variations and modifications may be resorted to which fall within the scope of the invention as claimed.

In the drawing:

Figure 1 is a perspective view of a heating device, in accordance with this invention having mounted therein a container to be heated, Figure 2 is a vertical sectional view of the device and further illustrating in dotted lines a container supported therein to be heated, and Figure 3 is a perspective view of the means for removable supporting a container within the device.

A heating device in accordance with this invention includes an open top housing or receptacle which may be constructed from earthenware, stoneware, porcelain, metallic or vitreous material, and if formed from a material other than metal it may be provided with a metallic lining. Preferably the housing, which is indicated generally at 5 will be constructed of earthenware and is so shown. The housing 5 may be of any suitable cross sectional contour; preferably it will be of cylindrical form and is so shown.

The housing 5 includes a cylindrical body part 6 formed with an open top and a circular bottom 7. The outer periphery of body part 6 may or may not be suitably ornamented. The housing 5 is provided with an opening, which may be formed in body part 6 or bottom 7. Preferably the opening indicated at 8 will be disposed in one side of body part 6 in close proximity to bottom 7. The inner diameter of body part 6 will be greater than the diameter of the container, the contents of which are to be heated, and such container, as shown, is in the form of a bottle and indicated at 9. The body part 6 has the major portion of its length of uniform thickness and the remaining portion of its length, indicated at 10, of gradually increasing thickness. The said remaining portion 10 of body part 6 is the upper terminal portion of the latter and it is so formed that the outer diameter of the housing 5 is uniform throughout, its inner diameter from bottom 7 to portion 10 uniform and its inner diameter from the lower end of portion 10 to the top edge of body part 6 gradually decreasing throughout. The inner face 11 of the portion 10 of the housing 5 provides what may be termed a heat deflector or retarder when the device is used. The housing 5 forms a heating chamber 12 closed at its bottom and open at its top. The housing 5 will be of the desired height and diameter.

The device includes a combined conduit forming and suspension member 13 in the form of a tube 14 having threads 15 on its outer periphery. The member 13 extends through the opening 8 into the lower portion of the chamber 12. Positioned on the member 13 is a pair of spaced sealing gaskets 16, 17, one positioned against the outer face and the other against the inner face of body part 6. The tube 14 is connected to and the gaskets 16, 17 clamped against the body part 6 by a pair of clamping nuts 18, 19 which are mounted on and threadedly engage with tube 14.

Threadedly engaging with the inner terminal portion of the member 13 is an upstanding support 20 for a lamp socket 21. The support 20 is tubular and it consists of a body part 22 formed of a horizontal leg 23 merging at its inner end into a vertically disposed leg 24 having projecting from its upper end a peripherally threaded nipple 25, which has threaded engagement with an internally threaded collar 26 on the lower end of the socket 21. The legs 23, 24 are internally threaded and the leg 23 encompasses and has threaded engagement with the member 13. Passing through the member 13 and support 20, and connected to the lamp socket 21 are the circuit conductors 27. Extending into the socket 21 is a heating element 28 in the form of an electrical lamp.

The device includes a supporting means for the bottle 9 and such means is in the form of a reinforced grill 29 of materially less height than that of housing 5, but the height of grill 29 with respect to the housing 5 will preferably be such that when supporting the bottle 9 the upper end of the latter will project above the upper end of the housing whereby the bottle may be conveniently inserted into and removed from the chamber 12 with respect to the grill 29.

The grill 29 may be of any suitable form, but preferably it will be constructed in the manner as shown, and it includes a skeleton top 30, a plurality of spaced vertical supporting legs 31 depending from top 30 and a combined spacing and reinforcing means 32 of ring-like form, secured as at 33 to the legs 31 intermediate the upper and lower ends of the latter. The means 32 preferably will be secured to the inner face of said legs. The grill 29 is for mounting in the chamber 12 on the upper face of the bottom 7 of housing 5, and its height will be such that the top 30 will be arranged over and in close proximity to the heating element 28. The bottom of the bottle 9 is to be positioned on grill top 30 when the contents of the bottle are to be heated.

It is to be understood that if desired there may be correlated with the heating circuit a thermostat of known form for controlling such circuit.

The housing 5 may be termed a receiving vessel, the elements 13 and 20 a combined conduit forming and heating element supporting means, and the element 29 a supporting structure for the article to be heated. The housing 5 may or may not be provided with handles.

What I claim is:

1. A heating device of the class described comprising a cylindrical container having an open top and closed bottom, said container having its wall of uniform gauge throughout the major portion of its length, a heat flow retarding baffle formed integral with the upper portion of said wall, said baffle having a convergent inner wall and a vertical outer wall, an L-shaped conduit mounted adjacent the closed bottom of said container with one leg of the L passing through the side wall of the container and secured therein, the other leg of said conduit extending upwardly from said first named leg co-axially with the vertical axis of the container, an electric lamp socket secured to the second named leg of said conduit in axial alignment therewith, an electric lamp mounted in said socket, and a support for the object to be heated.

2. A heating device of the class described comprising a cylindrical container having an open top and closed bottom, said container having its wall of uniform gauge throughout the major portion of its length, a heat flow retarding baffle formed integral with the upper portion of said wall, said baffle having a convergent inner wall and a vertical outer wall, an L-shaped conduit mounted adjacent the closed bottom of said container with one leg of the L passing through the side wall of the container and secured therein, the other leg of said conduit extending upwardly from said first named leg co-axially with the vertical axis of the container, an electric lamp socket secured to the second named leg of said conduit in axial alignment therewith, an electric lamp mounted in said socket, and a support for the object to be heated, said support comprising a perforate plate, spaced pairs of supporting legs for said plate and a ring brace secured to each of said legs, said support resting in said container with said plate being spaced above said lamp and said legs, and said brace encompassing said lamp.

WILLIAM L. CROUCH.